United States Patent [19]
Föhl

[11] Patent Number: 5,403,037
[45] Date of Patent: Apr. 4, 1995

[54] LINEAR DRIVE FOR A BELT PRETENSIONER

[75] Inventor: Artur Föhl, Schorndorf, Germany

[73] Assignee: TRW Repa GmbH, Alfdorf, Germany

[21] Appl. No.: 53,713

[22] Filed: Apr. 27, 1993

[30] Foreign Application Priority Data

May 5, 1992 [DE] Germany .................. 4214837.5
Jul. 13, 1992 [DE] Germany .................. 4222985.5

[51] Int. Cl.6 .................................... B60R 22/46
[52] U.S. Cl. .......................... 280/806; 297/480
[58] Field of Search ............ 280/806, 734, 735; 297/480; 180/282; 200/61.45 R, 61.53

[56] References Cited

U.S. PATENT DOCUMENTS

| | | | |
|---|---|---|---|
| 3,638,501 | 2/1972 | Prachar | 200/61.53 |
| 4,441,738 | 4/1984 | Tsuge et al. | 280/806 |
| 5,129,680 | 7/1992 | Mori | 280/806 |
| 5,143,403 | 9/1992 | Fohl | 280/806 |
| 5,149,134 | 9/1992 | Fohl | 280/806 |

FOREIGN PATENT DOCUMENTS

| | | | |
|---|---|---|---|
| 0306299 | 3/1989 | European Pat. Off. | |
| 3718117 | 12/1988 | Germany | 280/806 |
| 4013046 | 10/1991 | Germany | 280/734 |

OTHER PUBLICATIONS

European Search Report EP 93 10 7295.

*Primary Examiner*—Karin L. Tyson
*Assistant Examiner*—Paul N. Dickson
*Attorney, Agent, or Firm*—Tarolli, Sundheim & Covell

[57] ABSTRACT

The linear drive for a belt pretensioner in a vehicle safety belt system excels by its elongated slim configuration and is thus suitable for incorporating in the longitudinal direction of the vehicle. The gas generator (20) is provided with an impact fuse which interacts with a spring-loaded striker (32). The striker (32) is maintained in its rest position by locking means (48). By means of a slidable sensor inertial body (26) in a housing (12) the lock can be cancelled to release the striker (32). The housing which also accommodates the gas generator (20) is located in the elongation of the cylinder (10) to which it is rigidly connected. Sensor inertial body (26) and striker (32) are movable in parallel to the axis of the cylinder, thus achieving the slim configuration.

14 Claims, 6 Drawing Sheets

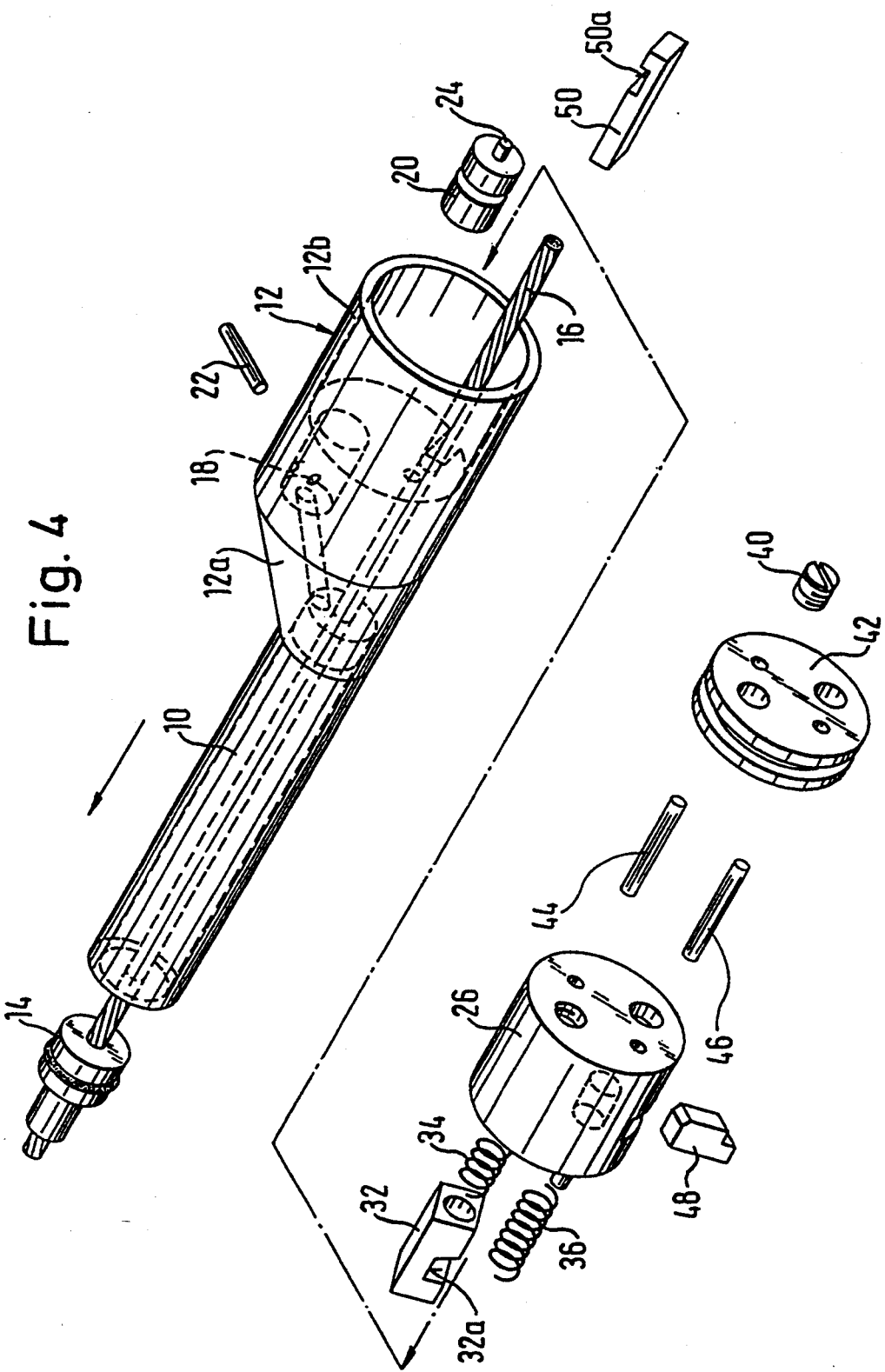

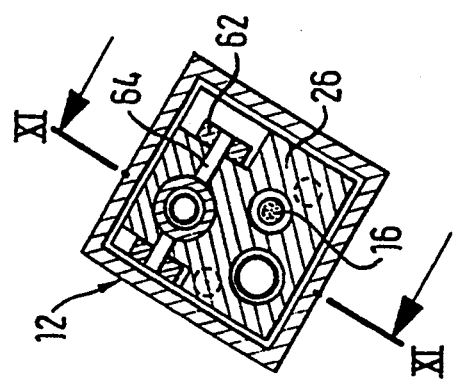
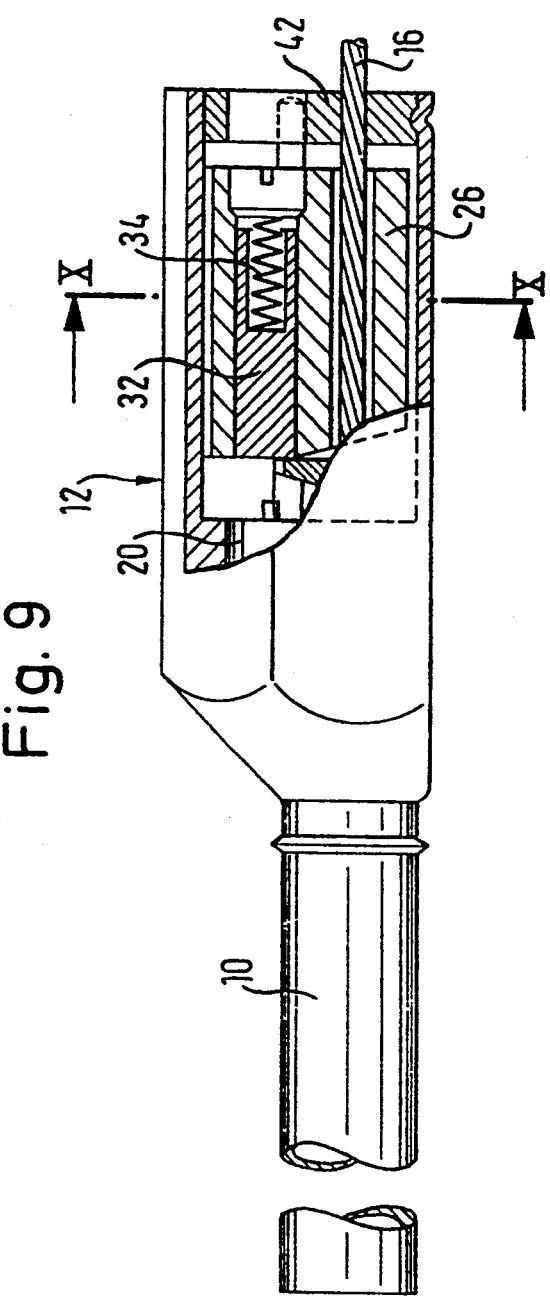
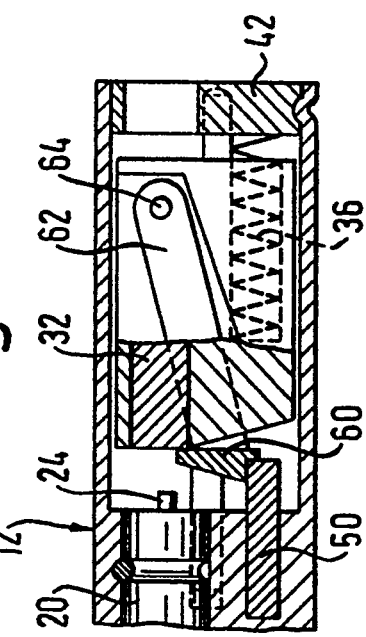

LINEAR DRIVE FOR A BELT PRETENSIONER

BACKGROUND OF THE INVENTION

The invention relates to a linear drive for a belt pretensioner in a vehicle safety belt system comprising a cylinder in which a piston is slidably accommodated, a pyrotechnical gas generator with an impact fuse, and a vehicle-sensitive sensor inertial body slidably arranged in a housing secured to the vehicle body.

In a linear drive of this type, an impact member, or striker, is held in a rest position by locking means spaced away from the impact fuse of the gas generator and is spring-loaded in the direction against the impact fuse. By vehicle-sensitive movement of the sensor inertial body the striker is released, the gas generator is thus activated and the piston is driven by the compressed gases liberated from the gas generator movement of the piston being transmitted to some component in the safety belt system to remove slack of the belt.

This type of linear drive can be arranged separate from a belt retractor or a fitting of the safety belt system, since the piston may be connected by a cable to the belt retractor or fitting. Using a cable also makes it possible to provide a deflection thus creating a high freedom of choice of location for accommodating the linear drive in the vehicle relative to the other components of the safety belt system.

SUMMARY OF THE INVENTION

The present invention provides a linear drive for a belt pretensioner in a vehicle safety belt system which excels by its particularly slim configuration and is suitable for accommodation in the door sill area of the vehicle body.

According to the present invention, a linear drive for a belt pretensioner in a vehicle safety belt system is provided which comprises a cylinder, a piston slidably accomodated in the cylinder, a pyrotechnical gas generator with an impact fuse and an elongated housing accomodating the gas generator and integrally connected with said cylinder. The cylinder forms a longitudinal extension of the housing. A vehicle-sensitive inertial body is slidably accomodated in a bore of the housing. An impact member is slidably received in the housing and spring-loaded in a direction towards the impact fuse of said gas generator. A locking member releasably holds the impact member in a position spaced from the impact fuse. The piston, the inertial body and the impact member are movable in mutually parallel directions, and the locking member is movable transversely to these directions. Movement of the inertial body in the housing causes the locking member to release the impact member, whereby said impact member strikes said impact fuse, said gas generator is activated and pressurized gas produced by said gas generator drive the piston within the cylinder. By arranging the housing in the longitudinal extension of the cylinder the intended, elongated and slim configuration is attained. The moving parts such as the sensor inertial body and striker accommodated within the housing are guided parallel to the axis of the cylinder so that the transverse dimensions of the housing can be maintained small. In this way the outer dimensions of the housing, the cross section of which may be circular or rectangular, are restricted to little more than the diameter of the cylinder. The gas generator can also be easily accommodated in the housing which for this purpose is provided with a suitable bore oriented parallel to the axis of the housing.

A further contribution towards the compact configuration results from radially arranging the striker within the sensor inertial body in the preferred embodiment. In particular the sensor inertial body features a passage to accommodate and guide movement of the striker.

The transition between the cylinder and the housing is preferably made at the tapered end of the housing in which the gas generator is incorporated. The sensor inertial body is incorporated in the adjoining tubular cylinder portion of the housing.

The locking member holding the striker in its rest position is, however, movable transversely to the longitudinal direction of the housing, without necessitating an increase in the outer dimensions of the housing, since this locking member is required to implement merely a minor portion of the control stroke in the radial direction. Several embodiments of the locking member and its arrangement are stated in claims 6 thru 10. Among these embodiments particular emphasis is placed on those in which the sensor inertial body is movable in two opposing directions and in which release of the belt tensioner is permitted by movement of the sensor inertial body in both directions.

BRIEF DESCRIPTION OF THE DRAWINGS

Further features and advantages of the invention are evident from the following description of a preferred embodiment and from the drawing to which reference is made, wherein:

FIG. 4 is an exploded view of embodiment of the belt tensioner shown in FIGS. 1 thru 3;

FIG. 9 is a longitudinal section of another embodiment of the belt tensioner;

FIG. 10 is a cross section along line X—X in FIG. 9;

FIG. 11 is a sectional view along line XI—XI in FIG. 10;

DESCRIPTION OF THE PREFERRED EMBODIMENT

Figure 2:
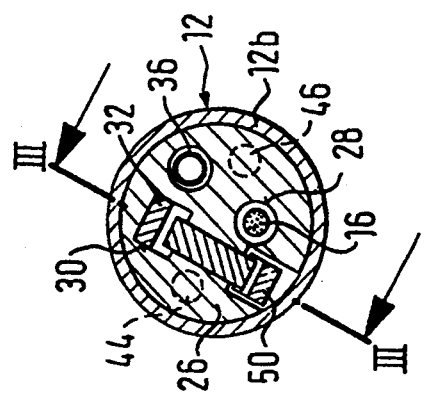
FIG. 2 is a cross section along line II—II in FIG. 1.

The linear drive for a belt tensioner is defined by an elongated slim assembly comprising a cylinder 10 and a housing 12 rigidly connected thereto and arranged in the longitudinal extension thereof, the tapered end 12a of which joins the neighboring front end of the cylinder 10 to which it is friction welded. In the cylinder 10 a piston 14 is slidably accommodated in a usual manner. To this piston 14 a cable 16 is secured which extends linearly through the housing 12 provided with a suitable passage.

Figure 1:
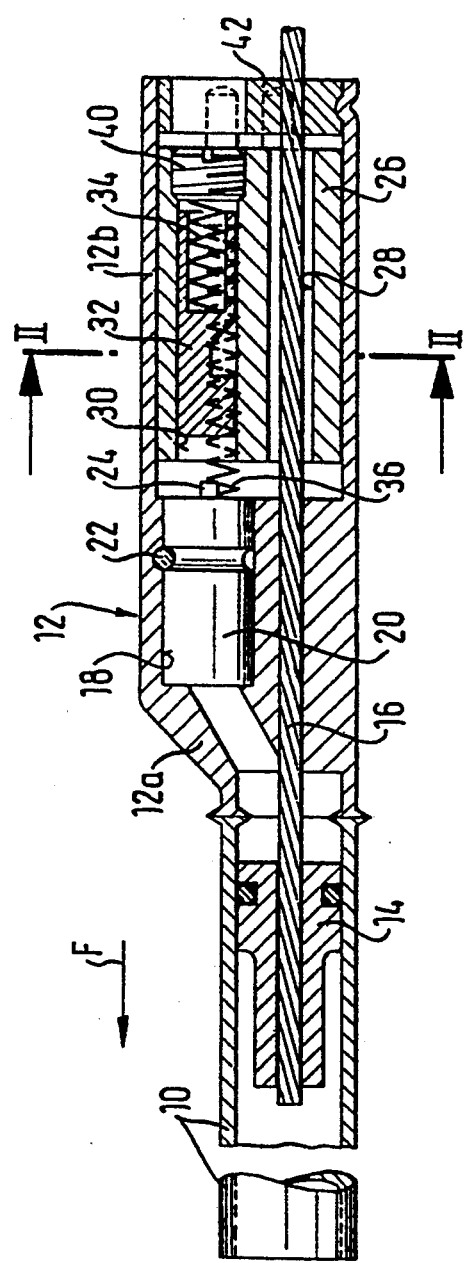
FIG. 1 is a longitudinal section through the cylinder and the belt tensioner housing jointed one-part thereto.
Figure 3:
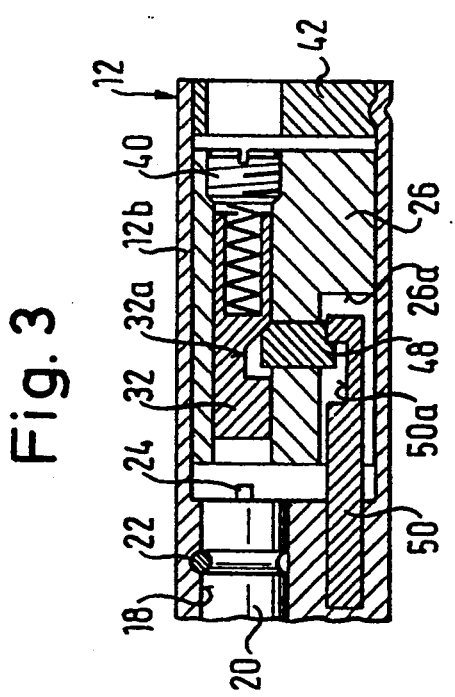
FIG. 3 is a longitudinal section along line III—III in FIG. 2.
Figure 6:
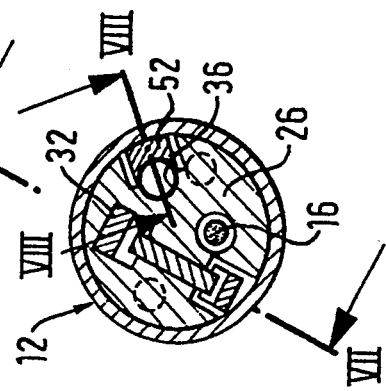
FIG. 6 is a cross section along line VI—VI in FIG. 5.
Figure 8:
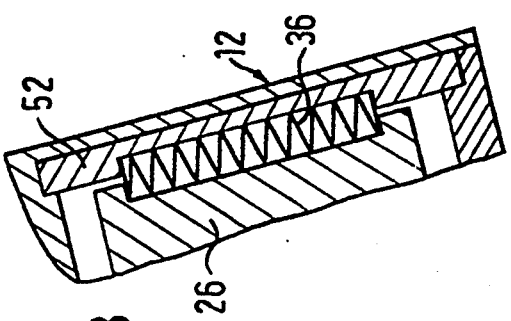
FIG. 8 is a partial section along line VIII—VIII in FIG. 6.
Figure 7:
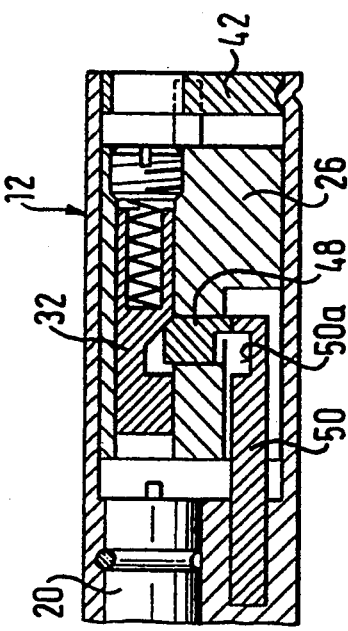
FIG. 7 is a longitudinal section along line VII—VII in FIG. 6.
Figure 5:
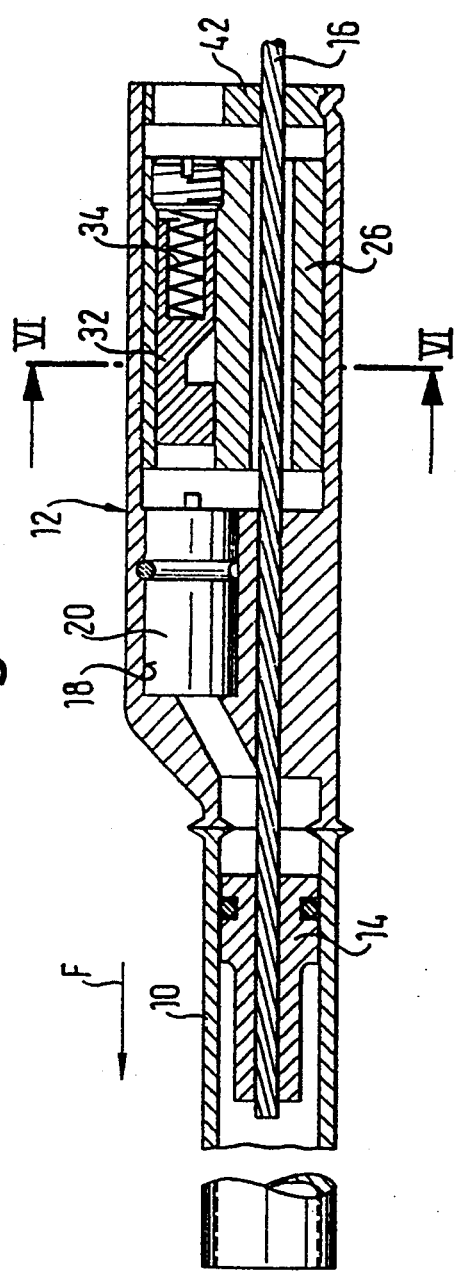
FIG. 5 is a longitudinal section of another embodiment of the belt tensioner.

The tapered end 12a of the housing 12 is provided with a hole 18 oriented parallel to the axis of this housing, a pyrotechnical gas generator 20 being inserted in this hole 18. The gas generator 20 is located in the bore 18 by means of a pin 22. The gas generator 20 is further provided with an impact fuse, a pin 24 of which is shown in FIG. 1.

The tapered end 12a of the housing 12 adjoins a tubular cylindrical portion 12b of the housing 12. In this tubular cylindrical portion 12b of the housing 12 a generally cylindrically shaped vehicle sensitive sensor inertial body 26 is slidably accommodated. The sensor inertial body 26 features a passage 28 for free passage of the cable 16. In sensor inertial body 26 a further passage 30 is defined, having a rectangular cross-section to receive a striker 32 for slidable accommodation in passage 30. This striker 32 which is also rectangular in shape, is spring-loaded by a compression spring 34 in the direction of the pin 24 of the impact fuse in the gas generator 20, but is held in the rest position shown in FIG. 1 by locking means as described below. The sensor inertial body 26 is spring-loaded in a direction away from the gas generator 20 by a compression spring 36 accommodated in an axial hole of the sensor inertial body 26.

Passage 30 for guiding the striker 32 is closed off at the end opposite the latter by a screwed plug 40 the inside surface of which mounts the compression spring 34. The free end of the housing 12 is further closed off by a disk-shaped closure part 42 in which two guide pins 44, 46 are anchored which locate corresponding guide holes in the sensor inertial body 26.

The aforementioned locking means holding the striker 32 in its rest position comprises a locking member 48 slidably arranged in a guide passage located vertically to the longitudinal axis of the sensor inertial body 26 and projecting at both ends from the passage. The first end of the locking member 48 projects into the passage 30 to engage a trapezoidal recess 32a of the striker 32. On this first end of the locking member 48 a ramp surface is defined which mounts the ramp surface of the trapezoidal recess 32a, both ramp surfaces having the same inclination. The second end of the locking member 48 projects into an axial concavity 26a of the sensor inertial body 26. A supporting member 50 anchored in the tapered housing section 12a also projects axially into the concavity 26a. This supporting member 50 features an axial supporting surface for the stepped second end of the locking member 48. A concavity 50a of the supporting member 50 adjoins this supporting surface via a radial step.

The functioning of the linear drive as shown in FIGS. 1 thru 4 will now be described. The elongated assembly comprising cylinder 10 and housing 12 is preferably located in the door sill area of the vehicle body. The cable 16 is attached to a belt reeler which by known means is provided with a cable pulley engaging the cable 16 by its periphery. The assembly is mounted oriented in the direction of travel as symbolized in FIG. 1 by an arrow F., i.e. the cylinder 10 is located in the direction of travel. The striker 32 is spring-loaded by compression spring 34 against pin 24 on the impact fuse of the gas generator 20, but is held in its rest position shown in FIG. 1 by the locking member 48 However, as soon as the sensor inertial body 26 overcomes the force of the spring 36 due to its mass inertia when the vehicle is abruptly decelerated and is shifted in the axial direction, the supporting surface on the second end of the locking member 48 slides on the corresponding supporting surface of the supporting member 50; when vehicle deceleration exceeds a critical amount the locking member 48 is able to deflect into the concavity 50a of the supporting member 50 and is pressed into the concavity 50a by the force of the spring 34, since the ramp surface on the first end of the locking member 48 engages the ramp surface of the recess 32a of the striker 32 having the same ramp inclination. As soon as the locking member 48 has entered the concavity 50a, the striker 32 is no longer obstructed in being forced by the spring 34 against the pin 24 on the impact fuse of the gas generator 20. The impact fuse then activates the gas generator 20 and the compressed gases released by the generator impinge on the piston 14, causing it to move in the cylinder 10 and thus taking the cable 16 with it.

In the embodiment according to the FIGS. 5 thru 8 the sensor inertial body 26 is movable both in the direction of travel F and in the opposite direction. By means of the compression spring 36, both ends of which are supported on both the sensor inertial body 26 and on the housing 12, the sensor inertial body 26 is maintained in a stable middle position due to the compression spring 36 being incorporated preloaded. This spring is accommodated in a pocket defined, on the one hand, by an axial recess on the outer circumference of the sensor inertial body 26 and, on the other, by an opposite recess in a molding 52 in housing 12 to which it is anchored.

The locking member 48 deviates from the embodiment as described, in that the flat supporting surface located opposite the supporting member 50 is defined on a projecting pad and features at both ends of the supporting surface a vertically backswept shoulder. The corresponding end of the locking member 48 in question can thus deflect into the concavity 50a of the supporting member 50 when the sensor inertial body 26 is deflected far enough in the one or other direction sensitive to the vehicle. In this embodiment the belt tensioner is effective in both the case of frontal impact and rear impact of the vehicle.

In all other respects the embodiment according to FIGS. 5 thru 8 is the same as that of FIGS. 1 thru 4 and is thus not detailed any further.

In the embodiment as shown in FIGS. 9 thru 11, housing 12 is defined square in cross section, sensor inertial body 26 also being defined correspondingly rectangular in general. In a departure from the two embodiments already described, locking member 60 is defined on a bracket 62 swivably mounted on two pins 64 of the sensor inertial body. Locking member 60 defines one web of bracket 62 and is supported by a supporting member 50 in the same manner as in the embodiments already described. The striker 32 comes into contact by its front surface, defined slanted, with the, also slanted, surface of the locking member 60. The compression spring 34 loading the striker 32 tends to shift the locking member 60 radially sideways in general by swivelling the bracket 62, however, locking member 60 continues to be supported by the supporting item 50 until the sensor inertial body 26 is located in the rest position as shown in FIGS. 9 and 11. When the sensor inertial body 26 is shifted sufficiently in the direction away from the cylinder 10, however, the locking member 60 is released to slide past the end of the supporting member 50 thus also releasing the striker 32.

An even slimmer design is achieved by the embodiment shown in FIGS. 12 thru 15. Here, the housing arranged in the extended length of the cylinder 10 comprises three sections: a first housing section 12c connecting the cylinder 10 and in which the bore 18 is formed to receive the gas generator 20, a second relatively thin-walled, tubular housing section 12d connecting the housing section 12c and a third housing section 12e closing off the housing section 12d at its end opposite the gas generator 20 and which is plug-shaped. The housing sections 12c, 12d and 12e are connected together and to the cylinder 10 after being jointed together in the axial direction, by calking, the connection between the housing sections 12c and 12d being made by means of an intermediate sleeve 68 which also supports the gas generator 20 in the axial direction.

Figure 13:
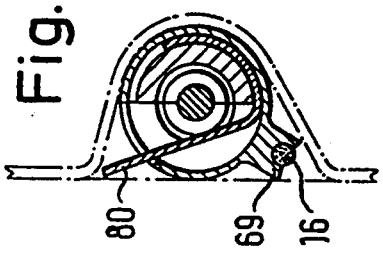
FIG. 13 is a cross section along line XIII—XIII in FIG. 12.
Figure 14:
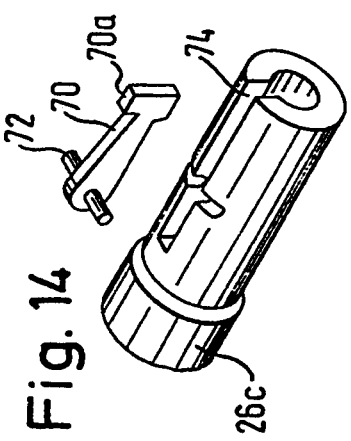
FIG. 14 is a perspective detail view of a locking means.
Figure 15:
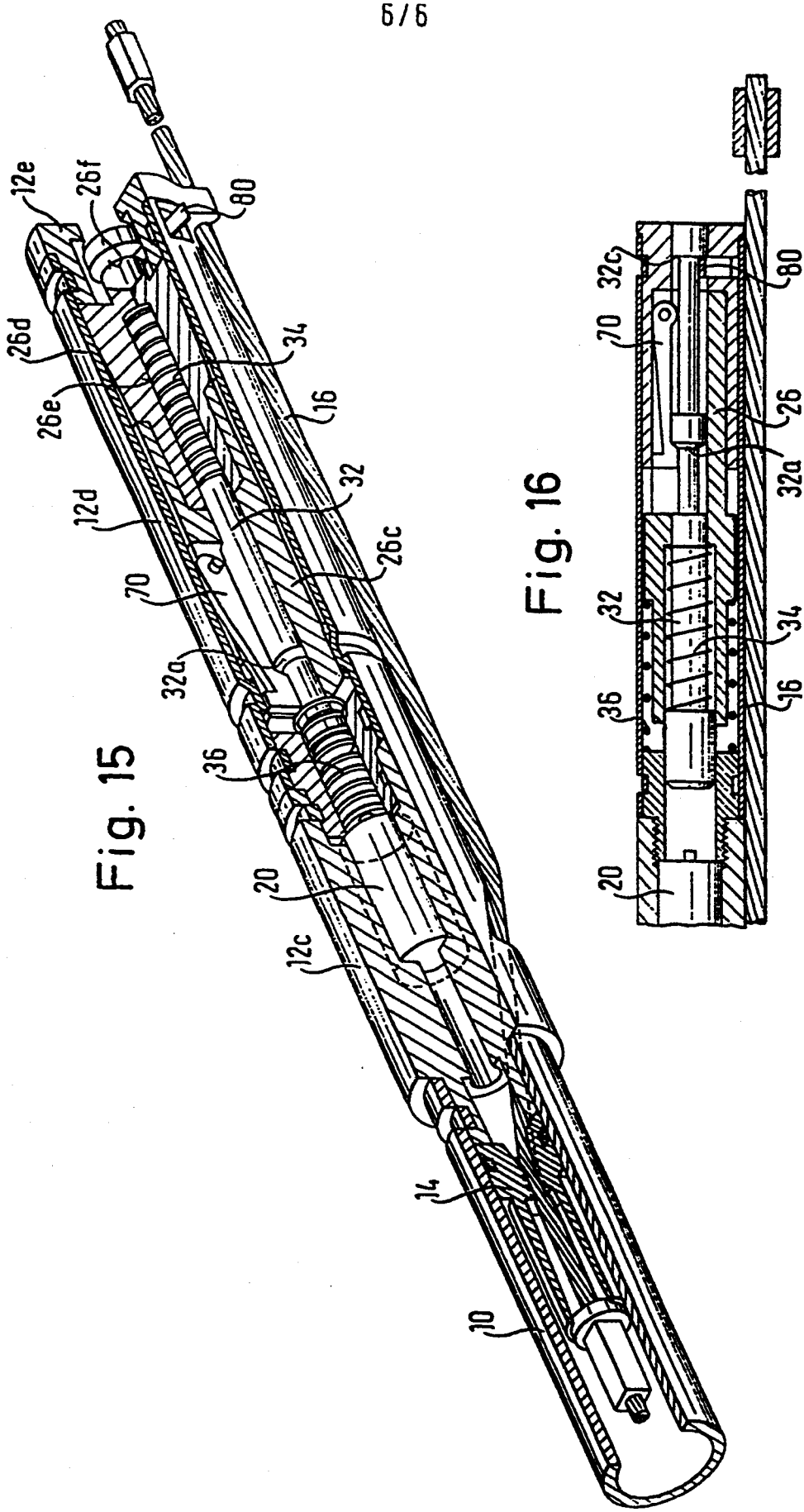
FIG. 15 is a cut-open perspective view of the linear drive.

The slim design in this embodiment is achieved by bringing out the cable 16 from a bore 12f oriented outwardly and slanting to the axis of the housing section 12c and guided by a channel 69 on the outside of the housing sections 12c, 12d, 12e. The channel 69 is, as illustrated in FIG. 13, formed in a rib oriented longitudinally to the outside of the housing sections 12c, 12d and 12e, this rib although projecting radially not proving to be a disturbance, however, since it is accommodated in a dish-shaped depression in the vehicle body when the assembly is mounted.

A further special feature of the embodiment according to FIGS. 12 thru 15 comprises the shape and arrangement of the striker 32. This is formed in general by a cylindrical rod which is coaxially accommodated slidably in a blind hole 26e of the sensor inertial body comprising the two sections 26c, 26d. The compression spring 34 actuating the striker 32 is received by section 26d of the sensor inertial body neighbouring the housing section 12e and is supported by its one end on the neighbouring end surface of the striker 32 and by its other end at the bottom of the blind hole 26e which accommodates the compression spring 34. A single-armed lever 70 is located rotatably by means of a pin 72 in an axial slot 74 on the outside of section 26a of the sensor inertial body. This lever 70 is hook-shaped at its free end, it engaging by means of this hook a circumferential groove of the striker 32, this groove forming a generally radial shoulder 32a. At its end opposite to the hook the lever 70 has a supporting part 70a extending radially outwards with which the lever 70 is supported by a step 76 of housing section 12 extending radially inwards. This step 76 forms a radial shoulder on the side facing the gas generator 20 which permits a deflection of the supporting part 76 when the sensor inertial body 26c, 26d is shifted by mass inertia against the force of the compression spring 36 arranged within the intermediate sleeve 68. The hook at the end of the lever 70 is then released from the radial shoulder 32a of the striker 32 so that the latter is forced by the compression spring 34 against the gas generator 20.

Figure 12:
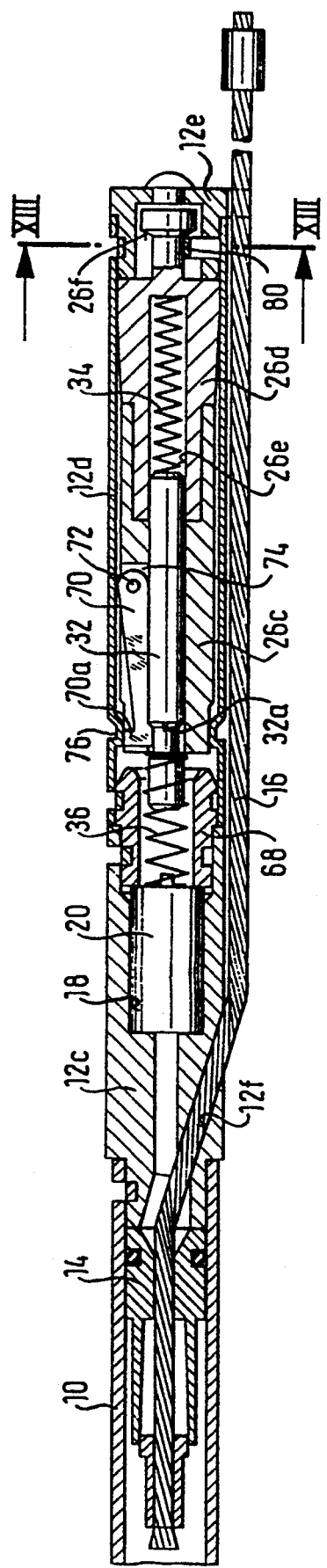
FIG. 12 is a longitudinal section of a further embodiment of the linear drive.

To ensure safe handling of the linear drive during its storage, transport and installation it is provided with a mounting lock. This mounting lock is formed by a leaf spring 80 defined by the circumference of the housing section 12e, this spring having a free limb which in the locked inactive condition of the linear drive as shown in FIG. 12 engages a radial shoulder 26f of an axial grooved projection of section 26d of the sensor inertial body. The free limb of the leaf spring 80 protrudes through the windowlike opening of the housing section 12d outwardly and is deflected by installation of the assembly as shown in FIG. 13 so that it is released from the radial shoulder 26f and unlocks the sensor inertial body.

Figure 16:
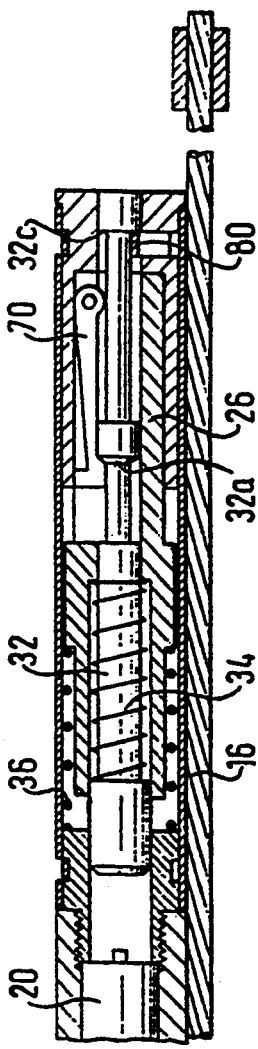
FIG. 16 is a partial view of an embodiment variant.

The embodiment as shown in FIG. 16 differs from that shown in FIGS. 12 thru 15 by the shape of the striker 32 and the arrangement of the lever 70 at the end of the sensor inertial body 26—here formed as a single part—opposite the gas generator 20. In addition, the leaf spring 80 belonging to the mounting lock does not engage the sensor inertial body 26 but the striker 32 which includes an end protruding axially from the sensor inertial body 26, a radial shoulder 32c being formed at this end by means of a groove.

In the embodiments illustrated by FIGS. 12 thru 15 and FIG. 16 the swivel axis of the lever 70 in relation to the engaging surface of the hook at the striker 32 is radially outwards so that the lever 70 is loaded by an opening moment, i.e. it attempts to swivel radially outwards to release the striker 32. To reliably ensure the release of the lever 70 from the radial shoulder 32a of the striker 32 this shoulder 32a—as indicated in the drawing—may be inclined slightly to the radial direction.

I claim:

1. A linear drive for a belt pretensioner in a vehicle safety belt system, comprising:
    a cylinder;
    a piston slidably accommodated in said cylinder;
    a pyrotechnical gas generator with an impact fuse;
    an elongated housing accommodating said gas generator;
    a vehicle-sensitive inertial body slidably accommodated in a bore of said housing;
    an impact member slidably received in said housing and spring-loaded in a direction towards the impact fuse of said gas generator; and
    a locking member which releasably holds said impact member in a position spaced from said impact fuse;
    said housing having an axial end adjacent said gas generator and said cylinder having an axial end adjacent said piston, said axial ends of said housing and of said cylinder being integrally connected so that said cylinder forms a longitudinal extension of said housing;
    said piston, said inertial body and said impact member being movable in mutually parallel directions and in the same direction, and said locking member being movable transversely to said directions;
    movement of said inertial body in said housing causing said locking member to release said impact member, whereby said impact member strikes said impact fuse, said gas generator is activated and pressurized gas produced by said gas generator drives said piston within said cylinder.

2. The linear drive of claim 1, wherein said inertial body has a guiding channel therein and said impact member is slidably accomodated in said guiding channel.

3. The linear drive of claim 1, wherein said housing has a first section adjacent said cylinder and accomodating said gas generator, and a second section accomodating said inertial body.

4. The linear drive of claim 3, wherein said first housing section has a tapered end connected to said cylinder.

5. The linear drive of claim 3, wherein said second housing section has an end opposite said cylinder and a closure member is mounted in said end, said closure member carrying a guide pin, said inertial body having an axial end facing said closure member and provided with an axial bore therein, and said guide pin being engaged in said axial bore.

6. The linear drive of claim 1, wherein said impact member is spring-loaded by a compression spring accomodated in a bore of said inertial body.

7. A linear drive for a belt pretensioner in a vehicle safety belt system, comprising:
- a cylinder;
- a piston slidably accommodated in said cylinder;
- a pyrotechnical gas generator with an impact fuse;
- an elongated housing accommodating said gas generator and integrally connected with said cylinder, said cylinder forming a longitudinal extension of said housing;
- a vehicle-sensitive inertial body slidably accommodated in a bore of said housing;
- an impact member slidably received in said housing and spring-loaded in a direction towards the impact fuse of said gas generator; and
- a locking member which releasably holds said impact member in a position spaced from said impact fuse;
- said piston, said inertial body and said impact member being movable in mutually parallel directions, and said locking member being movable transversely to said directions;
- movement of said inertial body in said housing causing said locking member to release said impact member, whereby said impact member strikes said impact fuse, said gas generator is activated and pressurized gas produced by said gas generator drives said piston within said cylinder;
- said inertial body has a guiding channel therein and said impact member is slidably accommodated in said guiding channel, said inertial body has a transverse passage and said locking member is slidably received in said passage, said locking member having a first end defining a ramp face and extending into said guiding channel and a second end extending into a recess of said inertial body, said impact member having a ramp face bearing on the ramp face of said locking member, and said second end of the locking member being supported on a supporting member axially extending into said recess of the inertial body.

8. A linear drive for a belt pretensioner in a vehicle safety belt system, comprising:
- a cylinder;
- a piston slidably accommodated in said cylinder;
- a pyrotechnical gas generator with an impact fuse;
- an elongated housing accommodating said gas generator and integrally connected with said cylinder, said cylinder forming a longitudinal extension of said housing;
- a vehicle-sensitive inertial body slidably accommodated in a bore of said housing, said inertial body has an axial passage and a cable connected to said piston extends through said passage;
- an impact member slidably received in said housing and spring-loaded in a direction towards the impact fuse of said gas generator; and
- a locking member which releasably holds said impact member in a position spaced from said impact fuse;
- said piston, said inertial body and said impact member being movable in mutually parallel directions, and said locking member being movable transversely to said directions;
- movement of said inertial body in said housing causing said locking member to release said impact member, whereby said impact member strikes said impact fuse, said gas generator is activated and pressurized gas produced by said gas generator drives said piston within said cylinder.

9. A linear drive for a belt pretensioner in a vehicle safety belt system, comprising:
- an axially extending cylinder;
- a piston slidably accommodated in said cylinder;
- a pyrotechnical gas generator with an impact fuse;
- an axially elongated housing accommodating said gas generator, said housing being located adjacent one axial end of said cylinder for providing a slim configuration;
- a vehicle-sensitive inertial body slidably accommodated in a bore of said housing;
- an impact member slidably received in said housing and spring-loaded in a direction towards the impact fuse of said gas generator; and
- and a locking member which releasably holds said impact member in a position spaced from said impact fuse;
- said housing having an axial end facing said one axial end of said cylinder for directing pressurized gas produced by said gas generator from said housing into said cylinder;
- said piston, said inertial body and said impact member being movable in mutually parallel directions and in the same direction, and said locking member being movable transversely to said directions;
- movement of said inertial body in said housing causing said locking member to release said impact member, whereby said impact member strikes said impact fuse, said gas generator is activated and pressurized gas produced by said gas generator drives said piston within said cylinder.

10. The linear drive of claim 9, wherein said inertial body has a guiding channel therein and said impact member is slidably accommodated in said guiding channel.

11. The linear drive of claim 9, wherein said housing has a first section adjacent said cylinder and accommodating said gas generator, and a second section accommodating said inertial body.

12. The linear drive of claim 11, wherein said first housing section has a tapered end connected to said cylinder.

13. The linear drive of claim 11, wherein said second housing section has an end opposite said cylinder and a closure member is mounted in said end, said closure member carrying a guide pin, said inertial body having an axial end facing said closure member and provided with an axial bore therein, and said guide pin being engaged in said axial bore.

14. The linear drive of claim 9, wherein said impact member is spring-loaded by a compression spring accommodated in a bore of said inertial body.

* * * * *